United States Patent Office 3,167,587
Patented Jan. 26, 1965

3,167,587
PREPARATION OF TRANS 1,2-DIAMINO-
CYCLOHEXANE
Andrew I. Smith, Raleigh, N.C., assignor, by mesne assignments, to Monsanto Company, a corporation of Delaware
No Drawing. Filed Dec. 28, 1961, Ser. No. 162,949
5 Claims. (Cl. 260—563)

This invention relates to the preparation of trans 1,2-diaminocyclohexane, and more specifically to the separation of trans 1,2-diaminocyclohexane from stereoisomeric mixtures of cis and trans 1,2-diaminocyclohexane, which mixtures may also contain additional minor impurities.

The 1,2-diaminocyclohexanes are known compounds which are valuable intermediate products for production of dyestuffs, textile assistants, fungicides, pesticides and pharmaceutical products.

Various methods have been proposed for the production of 1,2-diaminocyclohexane, e.g., the reduction of o-phenylenediamine and the reduction of 1,2-dinitrocyclohexane. Most of these prior art methods result in the production of a stereoisomeric mixture of cis and trans 1,2-diaminocyclohexane in varying proportions. Such mixtures of isomers are also produced by fractionating impurity concentrate streams which are discarded during the preparation of refined hexamethylene diamine by hydrogenation of adiponitrile for nylon manufacture.

In a typical purification of hexamethylene diamine prepared by hydrogenation of adiponitrile there is recovered an impurity stream, composed of water (9%), hexamethyleneimine (6%), 1,2-diaminocyclohexane (17%), hexamethylene diamine (67%), and trace amounts of other materials, which is presently discarded. By fractionating this mixture, a reasonably pure 1,2-diaminocyclohexane fraction may be obtained and this is a very economical source of trans 1,2-diaminocyclohexane, if the product can be separated from the cis isomer and from the various impurities associated therewith.

Though it has been desired to separate pure trans and cis 1,2-diaminocyclohexane from such isomeric mixtures as discussed above for purposes of conducting characterization and chemical tests and for preparing derivatives free from the derivatives of the other isomer, no economically attractive method has heretofore been developed. Though separation of the two isomers has been attempted by fractional distillation, it has been found that satisfactory separation cannot be obtained even when using a 100 theoretical plate distillation column at reduced pressures as low as 50 mm.

It is an object of the present invention to provide a method for the preparation of pure trans 1,2-diaminocyclohexane by the separation thereof from a mixture containing both the cis and trans isomer forms of 1,2-diaminocyclohexane.

It is a further object of this invention to provide such a process which is simple, economical and efficient.

It is a further object of this invention to provide a method for the preparation of trans 1,2-diaminocyclohexane which involves the separation thereof from a mixture containing both cis and trans isomers of 1,2-diaminocyclohexane as well as other minor impurities which may be present when the diaminocyclohexane is obtained by fractionation from the diaminocyclohexane containing by-product stream discarded in the commercial preparation of hexamethylene diamine by hydrogenation of adiponitrile.

Still further objects and advantages of the present invention will become apparent from the detailed description given hereinafter; it should be understood, however, that the detailed description and specific examples while indicating preferred embodiments are given by way of illustration only, since various changes and modifications within the spirit and scope of the invention will become apparent to those skilled in the art.

The above objects are accomplished according to this invention by reacting an isomeric mixture of cis and trans 1,2-diaminocyclohexane in aqueous solution with phosgene, whereupon insoluble N,N'-cyclohexylene urea formed by the trans isomer is precipitated, separated and then hydrolyzed in the presence of mineral acid to liberate the acid salt of pure trans 1,2-diaminocyclohexane. Any cis 1,2-diaminocyclohexane in the original mixture forms a soluble cyclohexylene urea derivative which is thereby separated along with any other minor impurities from the insoluble trans isomer.

In the first step of the process phosgene is bubbled into an aqueous solution of a 1,2-diaminocyclohexane isomer mixture. It is preferred, but not necessary, that the aqueous solution also contain an amount of dissolved alkali hydroxide, such as sodium hydroxide, potassium hydroxide, or ammonium hydroxide, at least equivalent to the diaminocyclohexane present. Most preferably, a molar ratio of at least 2:1 alkali hydroxide to diaminocyclohexane is employed to realize the optimum yield of N,N'-cyclohexylene urea. During this period the solution should be cooled to maintain the reaction temperature below 35° C. Generally, temperatures of 0° to 30° C. are satisfactory.

When phosgene uptake is complete, as indicated by cessation of absorption of the gas or when the weight increase equals the theoretical, the solid product is separated by filtration and then recrystallized from water or an alkanol, such as ethanol, propanol, etc. The recrystallized product, which is N,N'-cyclohexylene urea derived from the trans isomer, may be purified further if necessary, by additional recrystallizations with such solvents as ethanol or ethanol-water mixtures. The product is then dried either upon the filter using suction or in a vacuum oven.

The pure 1,2-diaminocyclohexane in trans form is prepared from the above product by acid hydrolysis wherein the product is dissolved in a concentrated mineral acid, such as 60% sulfuric acid or 70% phosphoric acid and heated to form the acid salt of trans 1,2-diaminocyclohexane. The free product is liberated from the salt by addition of an alkaline hydroxide such as sodium hydroxide, potassium hydroxide, or ammonium hydroxide, and may then be further purified by fractionation if desired.

The following examples are given to more particularly illustrate the process of this invention. All parts and percentages are by weight.

Example I

Ten ml. (9.4 grams, 0.083 mol) of an isomeric 1,2-diaminocyclohexane mixture prepared from refined mixed isomers and having a composition of 2:1 trans:cis isomer, was dissolved in 60 ml. of water containing 8 grams of sodium hydroxide. The solution was placed in a large test tube and cooled in an ice water bath whereupon phosgene was bubbled into the solution through a sintered glass filter stick of medium porosity while the temperature was maintained below 30° C. The phosgene flow was discontinued when no further reaction appeared to be taking place, i.e. no more phosgene was absorbed. The weight increase, i.e., weight of phosgene reacted, was 7.8 grams (0.079 mol of phosgene). The reaction product, a white solid, was separated by filtration and consisted of two types of material which were separated by hand-picking, soft amorphous lumps, and hard, small crystals which melted at 200–210° C. The crystalline material, amounting to 6.03 grams, or a yield of 52%, based on the starting diamine or 78% based on the trans isomer, was recrystallized from absolute ethanol and the product obtained had a melting point of 233–235° C. as measured on a Fisher-Johns hot stage melting point apparatus. The product was identical with regard to melting point and infrared spectra, to that prepared from known trans 1,2-diaminocyclohexane by the same method. The melting point of N,N'-cyclohexylene urea is reported by Einhornn and Bull, Annalen, 1897, 295, 209 to be 230–231° C.

The above obtained N,N'-cyclohexylene urea is hydrolyzed by heating with 60% sulfuric acid at a temperature of 90–110° C. for a period of 2–4 hours. The hydrolysis product is the sulfric acid salt of trans 1,2-diaminocyclohexane. The acid solution is then cooled in an ice water bath and rendered alkaline by the addition of an excess of a 50% aqueous sodium hydroxide solution. The thus liberated 1,2-diaminocyclohexane is then extracted with a 9:1 ether:n-butanol solution and purified by fractionation after evaporation of the ether. The resulting product is identified as pure trans 1,2-diaminocyclohexane by gas chromatography.

It is seen from the above Example and description that this invention provides a simple, economical and efficient method for the separation of trans 1,2-diaminocyclohexane from stereoisomeric mixtures containing both the cis and trans form of 1,2-diaminocyclohexane.

It is apparent that numerous widely varying embodiments of this invention may be made without departing from the spirit and scope thereof and therefore it is not intended to be limited except as indicated in the appended claims.

What is claimed is:

1. A process for preparing pure trans 1,2-diaminocyclohexane from a mixture comprising trans 1,2-diaminocyclohexane and cis 1,2-diaminocyclohexane, comprising reacting phosgene with an aqueous solution of said mixture at a temperature below 35° C. to form a crystalline precipitate of N,N'-cyclohexylene urea, derived from the trans form, separating said crystalline precipitate from the solution, hydrolyzing said precipitate in mineral acid to form the acid salt of trans 1,2-diaminocyclohexane and recovering free trans 1,2-diaminocyclohexane by addition of an alkali hydroxide thereto.

2. A process for preparing pure trans 1,2-diaminocyclohexane from a mixture comprising trans 1,2-diaminocyclohexane and cis 1,2-diaminocyclohexane, comprising reacting phosgene with an alkali metal hydroxide solution of said mixture at a temperature below 35° C. to form a crystalline precipitate of N,N'-cyclohexylene urea, derived from the trans form, separating said crystalline precipitate from the solution, hydrolyzing said precipitate in mineral acid to form the acid salt of trans 1,2-diaminocyclohexane and recovering free trans 1,2-diaminocyclohexane by addition of an alkali hydroxide thereto.

3. The process according to claim 2 wherein the reacton temperature is maintained at from 0° to 30° C. during the addition of phosgene.

4. The process of claim 2 wherein the alkali metal hydroxide is present in a molar ratio of 2:1 to the diaminocyclohexane in solution.

5. The process of claim 2 wherein the crystalline N,N'-cyclohexylene urea is purified by recrystallization before hydrolysis thereof.

References Cited in the file of this patent

UNITED STATES PATENTS

| 2,850,532 | Simon | Sept. 2, 1958 |
| 2,933,503 | Clark et al. | Apr. 19, 1960 |

FOREIGN PATENTS

| 1,054,999 | France | Oct. 14, 1953 |

OTHER REFERENCES

Einborn et al.: Ann. der Chem., vol. 295, pp. 209–222 (1897).